(12) United States Patent
Miyano (10) Patent No.: US 6,480,807 B1
(45) Date of Patent: Nov. 12, 2002

(54) MICROPATTERN MEASURING METHOD AND APPARATUS, AND RECORDING MEDIUM THAT RECORDS MICROPATTERN MEASURING PROGRAM

(75) Inventor: Yumiko Miyano, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 223 days.

(21) Appl. No.: 09/665,942

(22) Filed: Sep. 21, 2000

(30) Foreign Application Priority Data

Sep. 22, 1999 (JP) .......................................... 11-268711

(51) Int. Cl.[7] ............................................. G01B 11/02
(52) U.S. Cl. ........................ 702/159; 382/144; 382/145
(58) Field of Search ................................. 382/144, 145; 702/159

(56) References Cited

U.S. PATENT DOCUMENTS 6,173,070 B1 * 1/2001 Michael et al. ............. 382/145
6,363,167 B1 * 3/2002 Miyano et al. ............. 382/144

* cited by examiner

Primary Examiner—John S. Hilten
Assistant Examiner—Stephen J. Cherry
(74) Attorney, Agent, or Firm—Finnegan, Henderson, Farabow, Garrett & Dunner, L.L.P.

(57) ABSTRACT

An image acquiring section acquires a pattern image of a sample. A figure creating section creates a figure, which reflects a shape of the micropattern, on the basis of the pattern image. A density distribution data acquiring section acquires density distribution data on a straight line perpendicular to a tangential line of an outline of the figure. An edge detecting section detects pattern edge coordinates from the density distribution data. A pattern shape measuring section measures a shape of the micropattern on the basis of the pattern edge coordinates.

8 Claims, 5 Drawing Sheets

MICROPATTERN MEASURING METHOD AND APPARATUS, AND RECORDING MEDIUM THAT RECORDS MICROPATTERN MEASURING PROGRAM

CROSS-REFERENCE TO RELATED APPLICATIONS

This application is based upon and claims the benefit of priority from the prior Japanese Patent Application No. 11-268711, filed Sep. 22, 1999, the entire contents of which are incorporated herein by reference.

BACKGROUND OF THE INVENTION

This invention relates to a micropattern measuring method and apparatus for measuring the pattern of a sample, and a recording medium that records a micropattern measuring program.

A method for observing a pattern on a wafer and measuring the size of the pattern, using, for example, a scanning electron microscope is widely employed for estimating a process for manufacturing semiconductor devices. In accordance with the development of device integrating techniques, various patterns are now being formed on wafers. Therefore, the conventional one-dimensional pattern measuring method cannot always detect a parameter that determines the feature of each semiconductor device. In light of this, two-dimensional measurement such as the circumferential length or the area of each device or the like has become important.

On the other hand, in accordance with the development of microfabrication of patterns, it is possible that the aberration of a lens incorporated in an exposure device will influence a lithography process for forming a pattern. In this case, for example, a deformed pattern may be obtained instead of a perfectly circular pattern. Thus, measuring the diameter of a pattern in one direction does not always provide the accurate size of the pattern. Also on this point, measuring the area of a pattern is important. Further, it is important to measure the roughness of the edge of a pattern for the estimation of, for example, a resist. In the prior art, the roughness of a pattern with a curvature, such as a hole pattern, cannot be calculated, though the roughness of a line pattern can be obtained easily.

Japanese Patent Application KOKAI Publication No. 7-27548, for example, discloses a method for solving problems as the above. In this method, an image of a hole pattern is converted to polar coordinates, and line data addition concerning the developed image is executed through 360 degrees, thereby detecting edge positions of the hole pattern. As a result, the diameter, radius, area, etc. of the hole pattern, which reflect all directions of the pattern, can be calculated.

However, in the case of a substantially perfectly circular hole pattern, components, which correspond to edge portions of the hole pattern and are included in the image of the hole pattern converted to polar coordinates, are arranged substantially linearly. On the other hand, in the case of a pattern having a high degree of roughness or an elliptic pattern, such components as the above are not arranged linearly, which may cause inaccurate detection of edge portions by line data addition. Also in this method, each edge is detected in a direction that is not perpendicular thereto, which degrades detection accuracy.

Figure 1A:
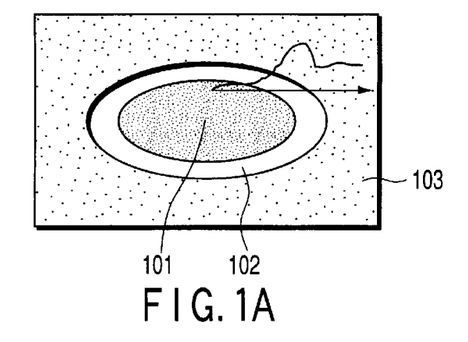
FIGS. 1A through 1D are views useful in explaining problems in conventional pattern edge detection.
Figure 1B:
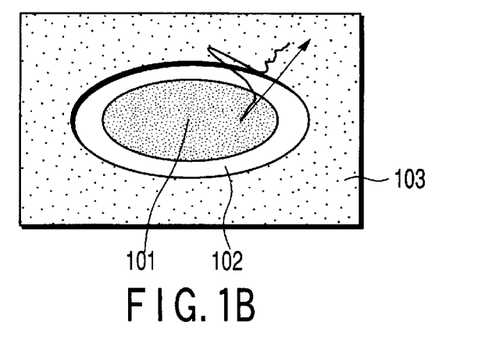

Referring to FIGS. 1A and 1B, the aforementioned problem caused by the method will be described in detail. In a case shown in FIGS. 1A and 1B, a tapered hole pattern is formed on a wafer. This pattern has a hole bottom region 101, a hole edge region 102 corresponding to a tapered portion of the hole, and an outside region 103. An image having portions corresponding to the regions 101–103 can be obtained. An edge is detected by obtaining a density distribution of the image in a direction as indicated by the arrow in FIG. 1A. In the case of edge detection executed in an oblique direction with respect to the edge as shown in FIG. 1A, a density distribution with a lower contrast is obtained than in the case of edge detection executed in a direction perpendicular to the edge as shown in FIG. 1B. Accordingly, the accuracy of detection is lower in the case shown in FIG. 1A.

As described above, in the conventional micropattern measuring methods, edge portions are each detected, on the basis of image data, in a direction that is not perpendicular thereto, and hence the detection accuracy of the position of each edge is low.

Figure 1C:
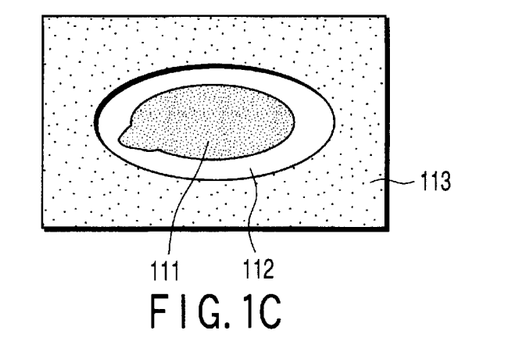
Figure 1D:
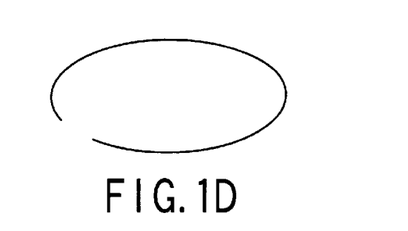

In addition, a labeling method as another micropattern measuring method is disclosed in "Japan Atheneum 132th Committee 125th Workshop (EB Testing Symposium/1993) Document, pp. 181–186 (1993)". Labeling indicates a method for dividing the density distribution of an image of a micropattern into a plurality of regions, using threshold values. Using the border lines of the labeled regions, the micropattern is measured. For example, this publication discloses a case of measuring a hole pattern. When measuring a hole pattern, at first, an image of the hole pattern is acquired. This image is subjected to three-valued processing concerning density. As a result of the three-valued processing, the image is divided into three regions—a hole bottom region, a hole edge region and another region. The boundary between the hole bottom region and the hole edge region is used as an edge, thereby allowing the measurement of the area or the circumferential length of each region. This method has the following problem:

FIG. 1C shows an example of an image obtained by the above hole pattern image acquisition. Reference numeral 111 denotes a hole bottom region, reference numeral 112 a hole edge region, and reference numeral 113 an outside region. If the hole edge region 112 is partially dark as shown in FIG. 1C, it is difficult to execute three-valued processing. If edge detection is executed on the basis of the image shown in FIG. 1C, the resultant edge has a gap corresponding to a dark portion of the hole edge region, as is shown in FIG. 1D. Thus, a desired edge cannot be obtained.

In this method, the entire image is subjected to processing. Therefore, the influence of noise cannot be avoided, with the result that edge detection cannot be executed accurately.

BRIEF SUMMARY OF THE INVENTION

It is the object of the invention to provide a micropattern measuring method, a micropattern measuring apparatus and a recording medium that records a micropattern measuring program, which enable accurate detection of edge portions of a micropattern and hence accurate measurement of the micropattern.

According to an aspect of the invention, there is provided with a micropattern measuring method, comprising the steps of: acquiring a pattern image of a sample provided with a micropattern formed thereon; creating a figure, which reflects a shape of the micropattern, on the basis of the pattern image; acquiring density distribution data on a straight line perpendicular to a tangential line of an outline of the figure; detect in g pattern edge coordinates from the density distribution data; and measuring a shape of the micropattern on the basis of the pattern edge coordinates.

According to another aspect of the invention, there is provided a micropattern measuring apparatus, comprising: a pattern image acquiring section for acquiring a pattern image of a sample; a figure creating section for creating a figure, which reflects a shape of the micropattern, on the basis of the pattern image; a density distribution data acquiring section for acquiring density distribution data on a straight line perpendicular to a tangential line of an outline of the figure; an edge detecting section for detecting pattern edge coordinates from the density distribution data; and a pattern shape measuring section for measuring a shape of the micropattern on the basis of the pattern edge coordinates.

In the present invention, a figure that reflects the shape of a pattern is created, and density distribution data on a straight line perpendicular to each tangential line of the outline of the figure is obtained, thereby detecting edge coordinates on the basis of the density distribution data. This enables edge detection at all times in a direction perpendicular to the outline of the pattern, which enhances the accurac y of the edge detection. Accordingly, shape parameters such as the area, the circumferential length, etc. of the pattern can be calculated significantly accurately since they are calculated based on the detected edge portions. Further, the roughness of even a pattern having a curvature can be measured easily.

Moreover, the figure that reflects the shape of a pattern is created by setting, in the micropattern, a representative point and a to-be-measured region extending through 360 degrees around the representative point, thereby obtaining a density distribution in units of a predetermined angle in the to-be-measured region, obtaining a density peak position in the density distribution, obtaining a rough outline of the micropattern on the basis of the density peak position, and creating the figure on the basis of the rough outline. Thus, only information near edge portions of the pattern is used to extract the feature of the pattern shape, which enables measurement that is not greatly influenced by noise. Also, since the to-be-measured region is defined by two closed lines that are out of contact with each other and concentric with each other, various types of patterns can be measured, and the time period required for measuring a pattern larger or smaller than a standard size can be significantly reduced.

According to yet another aspect of the invention, there is provided a computer readable recording medium that records a micropattern measuring program for supplying a computer with functions as described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 2:
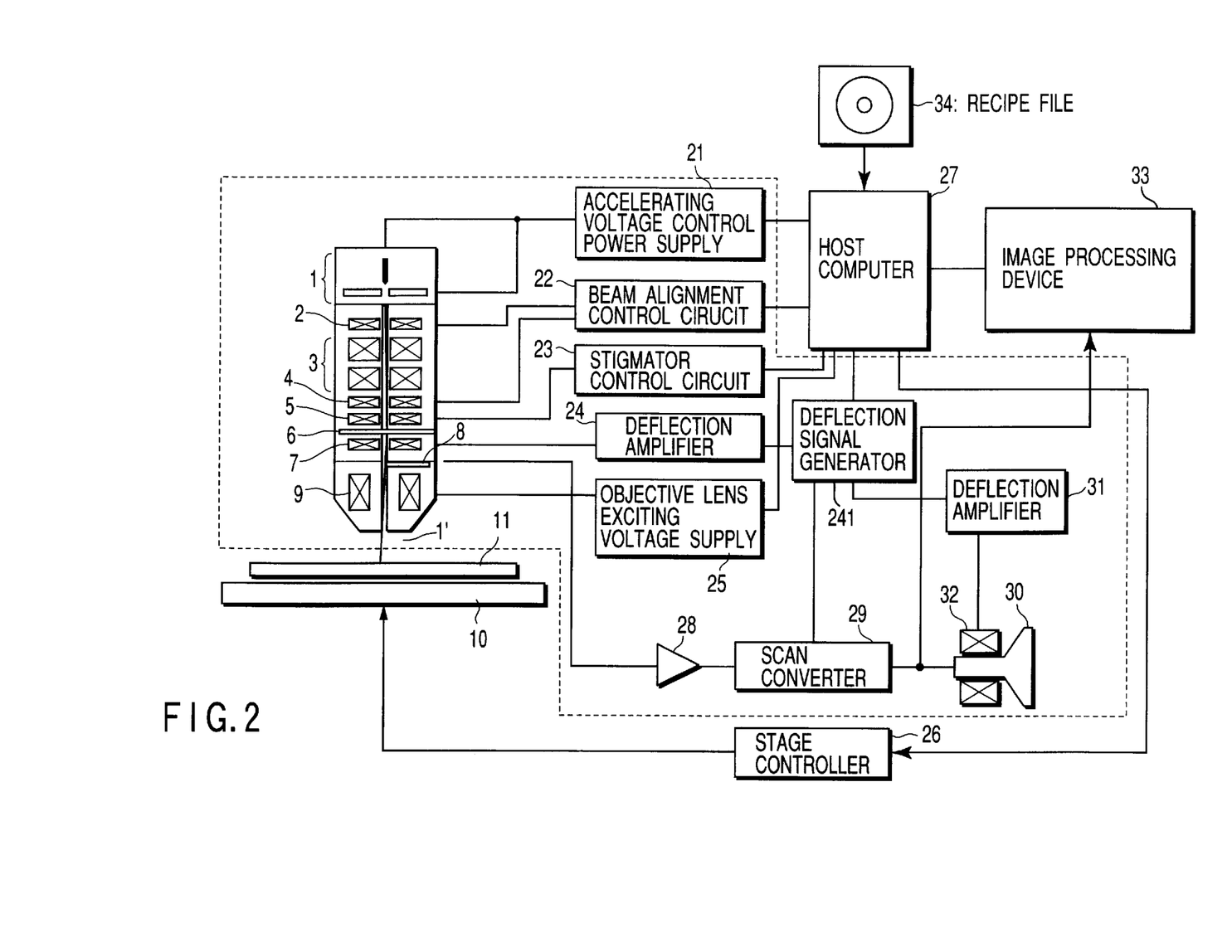
FIG. 2 is a block diagram illustrating the entire structure of a micropattern measuring apparatus according to a first embodiment of the invention.

The embodiments of the invention will be described with reference to the accompanying drawings.
(First Embodiment)
FIG. 2 is a block diagram illustrating the entire structure of a micropattern measuring apparatus of scanning electron microscope according to a first embodiment of the invention. This embodiment will be described, using an CD SEM.

As shown in FIG. 2, the scanning electron microscope of the first embodiment mainly comprises an electron gun 1 for emitting an electron beam 1', an electronic optical system for guiding the electron beam to a desired position on a sample 11 to be measured, and a secondary electron detecting mechanism for detecting secondary electrons emitted from the surface of the sample 11.

The electronic optical system includes a gun alignment coil 2, a condenser lens 3, an beam alignment coil 4, a stigmator coil 5, an aperture 6, a scanning coil 7, a secondary electron detector 8, and an objective lens 9. These elements of the optical system are provided in this order along the path of the electron beam 1'. The gun alignment coil 2 and the beam alignment coil 4 are provided for correcting the condenser lens 3 and the objective lens 9, respectively. The scanning coil 7 is formed of two pairs of electromagnetic coils. Power supplies of different frequencies are provided for the respective electromagnetic coils. As a result, an X-directional saw-tooth wave signal and a Y-directional saw-tooth wave signal are applied to the respective pairs of electromagnetic coils, thereby scanning the electron beam 1'.

After passing the electronic optical system, the electron beam 1' is guided onto a sample 11 placed on a stage 10. The secondary electronic detector 8 as a secondary electron detecting mechanism is provided at a predetermined distance from the sample 11 for detecting secondary electrons discharged from the surface of the sample 11.

The electron gun 1 is connected to a power supply 21 that controls an accelerated voltage. The accelerated voltage control power supply 21 enables the electron gun 1 to emit the electron beam 1' with a desired acceleration energy. The gun alignment coil 2 and the beam alignment coil 4 are connected to a beam alignment control circuit 22. The stigmator coil 5 is connected to a stigmator control circuit 23. The beam alignment control circuit 22 and the stigmator control circuit 23 correct the beam shape.

The scanning coil 7 is connected to a deflection amplifier 24, which is connected to a deflection signal generator 241 that generates a deflection signal. The deflection signal is amplified by the deflection amplifier 24 and applied to the scanning coil 7. The objective lens 9 is connected to an objective lens excitation voltage supply 25, which supplies an excitation voltage thereto. The stage 10 is connected to a stage controller 26 and driven by it. The elements 21–23, 241 and 26 constitute a control system, which is controlled by a host computer 27.

A secondary electron signal detected by the secondary electron detector 8 is input to a scan converter 29 via an amplifier 28. The scan converter 29 enables display, on a CRT 30, of the input the secondary electron signal in the form of an enlarged two-dimensional image.

The deflection signal generator 241 is connected to a deflection signal amplifier 31, which is connected to a scanning coil 32. The deflection signal amplified by the deflection signal amplifier 31 controls the scanning coil 32 so as to show the secondary electron signal on the CRT 30 which is synchronized with the beam scanning on the sample 11.

The secondary electron detecting signal converted into a two-dimensional image by the scan converter 29 is input to an image processing device 33, where desired image processing is executed. The image processing device 33 is connected to the host computer 27 and executes image processing under the control of the computer 27.

The host computer 27 controls the control system and image processing executed by the image processing device 33 on the basis of a predetermined recipe file 34. The recipe file 34 records entire parameter which is used for this micropattern measuring in this embodiment such as measurement order, measurement position information and so forth.

Figure 3:
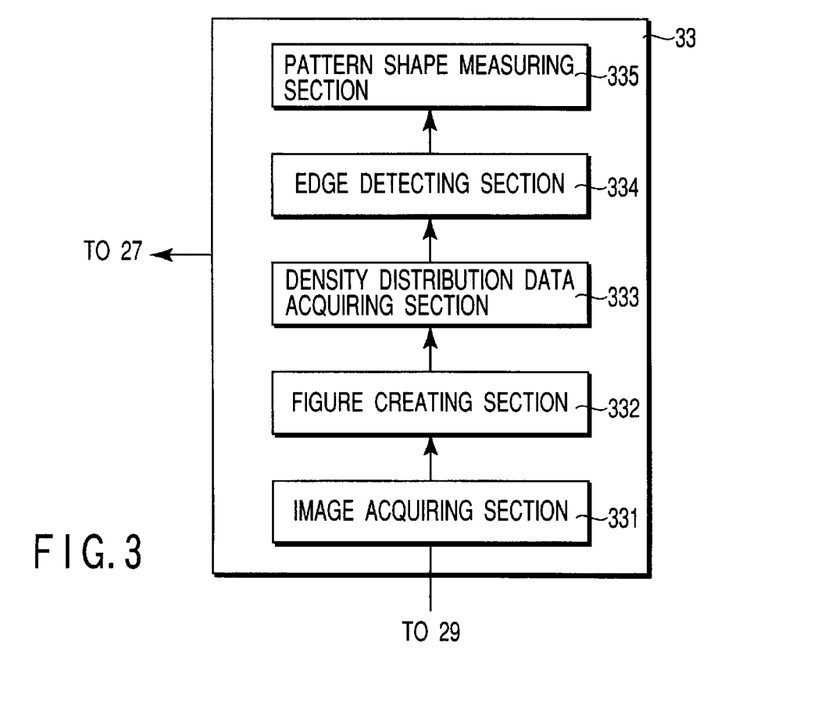
FIG. 3 is a view illustrating in detail an image processing device employed in the first embodiment.

FIG. 3 shows the image processing device 33 in detail. The image data as two-dimensional data obtained from the scan converter 29 is supplied to an image acquiring section 331. The image data acquired by the image acquiring section 331 is output to a figure creating section 332, which, in turn, creates a figure that reflects a to-be-measured pattern. The created figure data and the image data is output to a density distribution data acquiring section 333, which, in turn, creates density distribution data based on the figure data and outputs it to an edge detecting section 334. The edge detecting section 334 detects edge portions of the to-be-measured hole pattern from the density distribution data, and outputs information concerning the positions of the detected pattern edge portions to a pattern shape measuring section 335. On the basis of the pattern edge position data, the pattern shape measuring section 335 determines the shape of the pattern, i.e. the area, the circumferential length, etc. of the pattern, or the edge roughness of the pattern.

Referring then to FIGS. 2 to 9, a micropattern measuring method employed in the embodiment will be described. More specifically, a description will be given of a case where this method is used to measure, for example, an elliptic hole pattern having a cross section as shown in FIG. 4A. The cross section of the hole pattern is defined by a hole bottom portion 47 corresponding to the bottom of a hole, a hole edge portion 48 corresponding to the side wall of the hole, and an outside portion 49.

A sample (wafer) 11 provided with an elliptic hole pattern is transferred into a measuring device as shown in FIG. 2. After aligning the rotation of the sample 11 with the stage 10 by, for example, an alignment operation, the electron beam 1' is applied to the sample 11. At this time, the stage 10 is moved so that the to-be-measured hole pattern will be situated within the field of view.

Figure 4A:
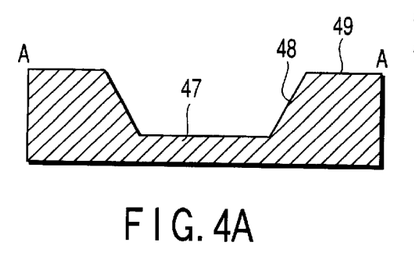
FIG. 4A is a sectional view illustrating a hole pattern to be measured by the measuring apparatus of the first embodiment.
Figure 4B:
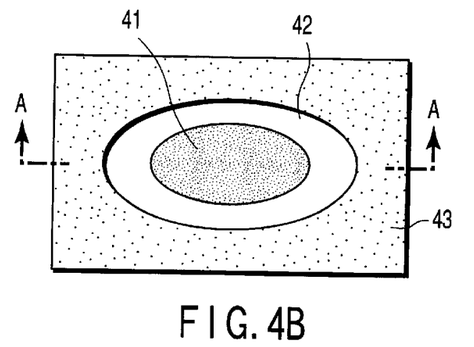
FIG. 4B is a view illustrating an SEM image of the to-be-measured hole pattern, obtained by the measuring apparatus of the first embodiment.

FIG. 4B shows an SEM image of the hole pattern obtained by the electron beam operation. As shown in FIG. 4B, the SEM image has a hole bottom region 41 corresponding to the hole bottom portion 47 of the elliptic hole pattern, a hole edge region 42 corresponding to the hole edge portion 48, and an outside region 43 other than the regions 41 and 42. The hole bottom region 41 is dark (black), the hole edge region 42 is bright (white), and the outside region 43 is somewhat bright (gray).

Obtained SEM image data is output to the figure creating section 332, where a figure that reflects the shape of the hole pattern is formed on the basis of the SEM image data. More specifically, for example, the SEM image data is subjected to three-valued processing, using predetermined threshold values. As a result, the SEM image data is labeled into three regions, i.e. a black region, a white region and a gray region, which are discriminated by the threshold values, thereby extracting a boundary between black and white regions. Thus, the edge (outline) of the hole bottom region 41 is extracted.

Instead of the tree-valued processing, differentiation processing may be executed on the SEM image data. In this case, only that portion of a resultant differentiation image, which has a high density, is extracted using a predetermined threshold. Alternatively, using the feature that the hole edge region 42 is white and bright, the hole edge region 42 and the other region may be determined by two-valued processing.

Figure 5:
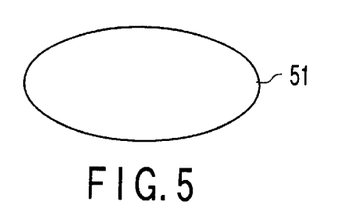
FIG. 5 is a view illustrating an example of a figure that reflects the to-be-measured hole pattern and is obtained by the measuring apparatus of the first embodiment.

In any one of the aforementioned reflection figure creating methods, a resultant SEM image contains a large number of salt-and-pepper noise components. To remove salt-and-pepper noise components on the outline of the bottom region, Fourier transform, for example, is used. As a result of noise removal, a figure that reflects the shape of the hole pattern is obtained. FIG. 5 shows an example of a figure that reflects the shape of the hole pattern. As is understood from FIG. 5, a reflection FIG. 51 (i.e. a figure that reflects the shape of the hole pattern) has substantially the same shape as the outline of the hole bottom region 41.

The obtained reflection FIG. 51 is output to the density distribution data acquiring section 333 with the image data, which, in turn, creates density distribution data based on the reflection FIG. 51 and the image data.

Figure 6:
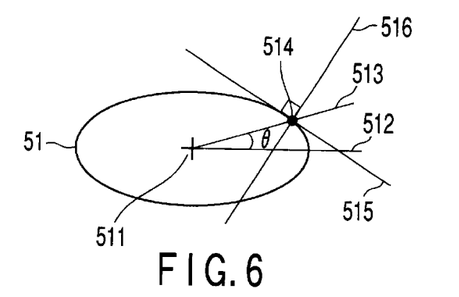
FIG. 6 is a view useful in explaining a density distribution data creating method used in the first embodiment.

Referring to FIG. 6, the method for creating the density distribution data will be described in detail.

First, the center-of-gravity 511 of the reflection FIG. 51 is obtained. Subsequently, a reference straight line 512 that extends from the center-of-gravity 511 is set. Then, a straight line 513 is drawn which extends from the center-of-gravity 511 at an angle θ with respect to the reference straight line 512. Other straight lines 513 are drawn in the same manner at respective angles Nθ (N: 2, 3, 4, . . . ) with respect to the reference straight line 512. Although FIG. 6 shows only one straight line 513 to facilitate the description, for example, 180 straight lines 513 can be drawn if the angle θ is set at 2°. After that, the intersection 514 between each straight line 513 and the outline of the reflection FIG. 51 is obtained. The inclination of the tangential line 515 of the reflection FIG. 51 at each intersection 514 is calculated by differentiation. Then, a density acquisition straight line 516 is drawn in a direction perpendicular to the inclination of each tangential line 515. Density distribution data on each density acquisition straight line 516 is obtained.

Figure 7:
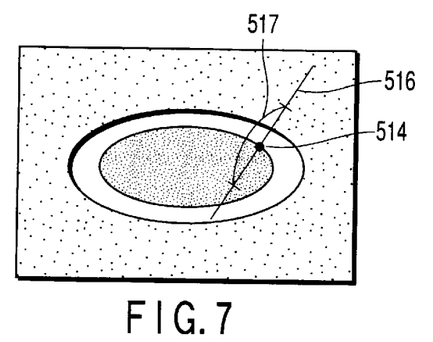
FIG. 7 is a view showing an SEM image and a density acquisition line, obtained in an image acquiring section incorporated in the first embodiment.

FIG. 7 shows an SEM image obtained in the image acquiring section 331 and one density acquisition straight line 516. The actual density distribution can be acquired only from that region (hereinafter referred to as a "density acquisition region 517") of each density acquisition straight line 516, which exists within a predetermined distance from a corresponding intersection 514. The density acquisition region 517 at least ranges from a point in the hole bottom region 41 to a point in the outside region 43 with the intersection 514 interposed therebetween, crossing the hole edge region 42 from its inner circumference to its outer circumference.

Figure 8:
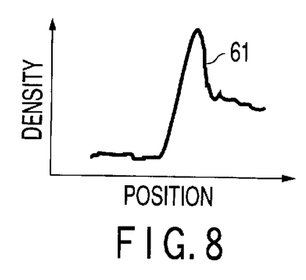
FIG. 8 is a graph illustrating a density distribution curve obtained in a density distribution acquisition region employed in the first embodiment.
Figure 9:
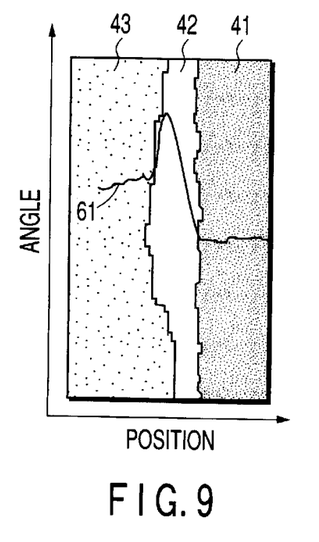
FIG. 9 is a view obtained by developing density distribution curves with respect to respective designated angles, used in the first embodiment.

FIG. 8 shows a density distribution curve 61 obtained in the density distribution acquisition region 517 set as the above. In FIG. 8, the abscissa indicates position, and the ordinate indicates density. The position closer to 0 corresponds to the hole bottom region 41 side, while the position remoter from 0 corresponds to the outside region 43 side. The density distribution curve 61 indicates only a density distribution concerning a single straight line 513 extending at the designated angle θ to the reference straight line 512 as shown in FIG. 6. If other density distribution curves 61 are obtained at the respective angles Nθ with respect to the reference line 512, and density distribution data based on the curves is developed, a density distribution as shown in FIG. 9 is obtained. The abscissa and the ordinate indicate position and angle, respectively. The abscissa of FIG. 9 is opposite in sign to that of FIG. 8. Accordingly, the position closer to 0 corresponds to the outside region 43 side, while the position remoter from 0 corresponds to the hole bottom region 41 side.

The density distribution data developed with respect to angle is output to the edge detecting section 334. The edge detecting section 334 detects the positions of edge portions of a hole pattern on the basis of the developed density distribution data, using, for example, the linear regression method as in the usual case of measuring the size of a line pattern. A figure similar to the outline of the hole bottom can be extracted by converting the obtained edge positions into an original image, i.e. a two-dimensional image obtained before the density distribution data is developed with respect to angle.

Data indicating the obtained edge positions is output to the pattern shape measuring section 335, which, in turn, measures the area, the circumferential length, etc. of the hole pattern from the outline of the pattern extracted from the pattern edge positions. The pattern shape measuring section 335 can calculate the roughness of hole pattern edge portions by detecting dispersion of the edge positions contained in the aforementioned developed data. In other words, it is sufficient if variations in edge position detected in units of the designated angle θ are obtained.

Figure 19A:
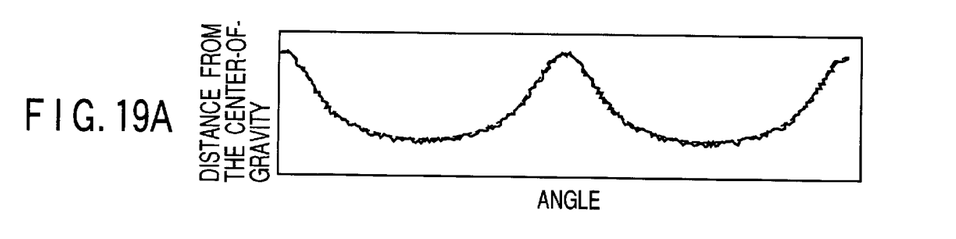
FIGS. 19A and 19B are representation to help explain an example of a roughness measuring method.
Figure 19B:
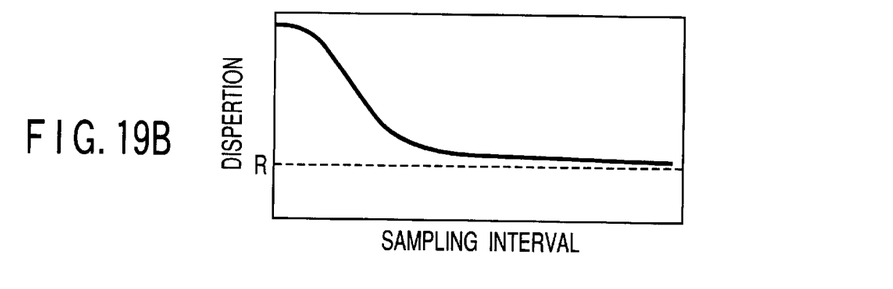

An example of a roughness measuring method will be described with reference to FIGS. 19A and 19B. FIG. 19A illustrates edge positions in the form of distances from the center-of-gravity and angles with respect thereto. The abscissa indicates angle, and the ordinate indicates distance. The broken line in FIG. 19A indicates ideal edge positions for comparison, i.e. edge positions assumed when there is no roughness. Data indicating the thus-obtained edge positions is subjected to Fourier transform. A roughness component is determined by the high frequency component of resultant data, since the low frequency component indicates variations in distance assumed when the pattern is elliptic.

Further, various sampling intervals are employed. Dispersion of edge positions is obtained at each sampling interval. FIG. 19B shows the relationship between dispersion and sampling interval. The abscissa indicates sampling interval, and the ordinate indicates dispersion. As is evident from FIG. 19B, the higher the sampling interval, the closer to a value R the value of dispersion. The dispersion value R indicates variations in distance assumed when the pattern is elliptic. Roughness is calculated by subtracting the dispersion, assumed when the pattern is elliptic, from dispersion obtained at a high sampling interval.

Alternatively, roughness may be calculated as a residual component obtained when the obtained edge positions are approximated to an ellipse.

As described above, in the first embodiment, edge positions can be detected in a direction perpendicular to the outline of a pattern, which enhances the detection accuracy of the edge positions. Accordingly, the measurement accuracy of shape parameters such as the area, circumferential length, etc. of a pattern, calculated on the basis of the detected edge positions, increases. Moreover, the edge roughness of even a pattern with a curvature can be measured more easily. In particular, the use of labeling enables easy creation of a figure that reflects a pattern shape.

Although, in the first embodiment, a figure as shown in FIG. 9 is created by developing density distribution curves, and edge positions are detected on the basis of this figure, this process can be omitted. Such a development data figure is not necessary if reference points are calculated from density distribution curves obtained in units of the designated angle θ, and directly plotted on a two-dimensional image.

(Second Embodiment)

This embodiment is a modification of the first embodiment. In the first embodiment, a figure that reflects the shape of a hole pattern is extracted by executing image processing on the entire hole pattern including a hole. However, an SEM image formed by this method contains lots of salt-and-pepper noise components. The noise components may, in particular, significantly influence the process of extracting a figure. The second embodiment is characterized in that a figure that reflects the shape of a to-be-measured pattern is extracted by a method different from that used in the first embodiment. In this embodiment, no detail description will be given of similar constituents to those of the first embodiment.

First, a sample (wafer) 11 provided with a hole pattern is transferred into a measuring device as shown in FIG. 2. After aligning the rotation of the sample 11 with the stage 10 by, for example, an alignment operation, the electron beam 1' is applied to the sample 11. At this time, the stage 10 is moved so that the to-be-measured hole pattern will be situated within the field of view. These operations are similar to those executed in the first embodiment.

After that, the sample 11 is scanned by the electron beam 1', and an SEM image of the sample 11 is obtained by the image acquiring section 331. The thus-obtained image data is provided from the image acquiring section 331 to the figure creating section 332. The figure creating section 332 executes the following operations. First, the coordinates of the center of a target pattern is obtained from the image data, using a reference image previously stored in a memory (not shown) incorporated in the image processing device 33.

Figure 10:
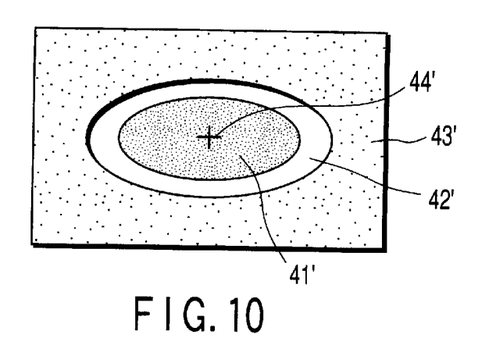
FIG. 10 is a view showing a reference image employed in a second embodiment of the invention.

FIG. 10 shows an example of the reference image. It is an image of substantially the same shape as the image data, and has a hole bottom region 41', a hole edge region 42' and an outside region 43'. A reference point 44' corresponding to the center of the target pattern is situated in the center of the hole bottom region 41'. This reference image is compared with the actually obtained SEM image, thereby obtaining a correlation coefficient. The position in which the correlation coefficient is not less than a predetermined value is determined to be the center of the target pattern.

Figure 11:
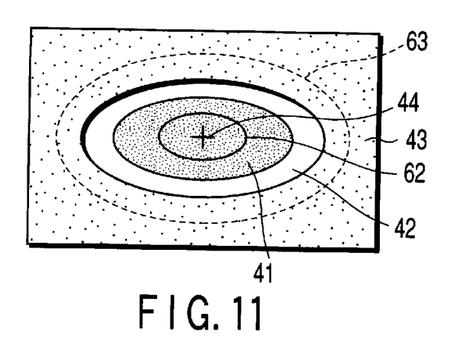
FIG. 11 is a view showing an example of a measurement range employed in the second embodiment for acquiring a reflection figure.

After that, a measurement range is set, using the determined center as the center of the range. FIG. 11 shows an example of the measurement range. As is shown in FIG. 11, a center point 44 is imparted as the center of the image data including the hole bottom region 41', the hole edge region 42' and the outside region 43'. Further, two concentric closed curves (big and small ellipsoids 62 and 63) are set which use the center point 44 as their center. The region defined by these two ellipsoids 62 and 63, i.e. the region extending outside the small ellipsoid 62 and inside the big ellipsoid 63, is the measurement range. The sizes of the ellipsoids 62 and 63 are set such that the entire hole edge region 42 is included in the measurement range.

The ellipsoids 62 and 63 are set, for example, similar to ellipsoids defined by the respective outlines of the hole bottom region 41' and the hole edge region 42'. In other words, the closed curves are not limited to ellipsoids but may be, for example, rectangles. Moreover, two closed curves may be created by extracting the outline of the pattern using the three-valued processing method, and enlarging or reducing the extracted outline by a certain amount.

In addition, where the allowable range of variations in to-be-measured pattern size is predetermined, it is preferable that a closed curve that defines the inner line of a measurement range is set at an allowable minimum size, and the other closed curve that defines the outer line of the measurement range is set at an allowable maximum size. This enables omitting of measurement of a pattern having a size that does not fall within the range, and hence enables reduction of the measurement time period.

Figure 12:
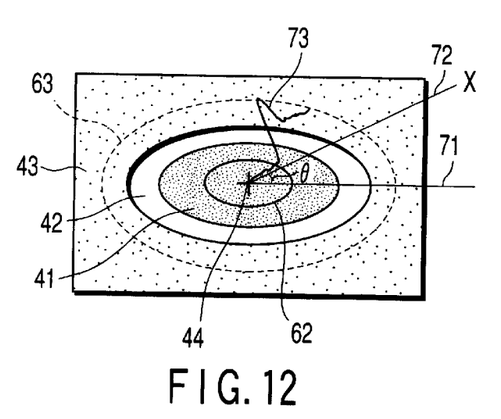
FIG. 12 is a view illustrating another example of the measurement range employed in the second embodiment for acquiring a reflection figure.

Then, density distribution data within the measurement range is acquired. FIG. 12 is a view useful in explaining a method for acquiring density distribution data. As is shown in FIG. 12, a straight line 72 is set, which extends from the center point 44 at a predetermined angle $\theta$ with respect to a reference straight line 71 that extends from the center point 44, and crosses the measurement range. Density distribution data 73 on the straight line 72 within the measurement range is acquired. Similarly, other straight lines 72 are obtained at respective angles $N\theta$ (N: 2, 3, 4, ... ) with respective to the reference straight line 71, and other density distribution curves 73 are obtained concerning the respective straight lines 72.

Figure 13:
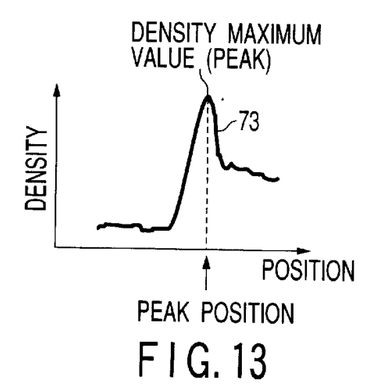
FIG. 13 is a graph showing density distribution data obtained in the second embodiment.
Figure 14:
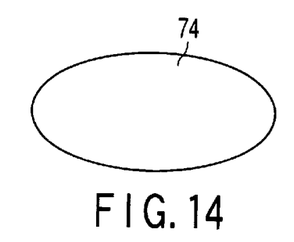
FIG. 14 is a view illustrating an example of a figure that reflects a to-be-measured hole pattern and is obtained by the second embodiment.

FIG. 13 shows one of the thus-obtained density distribution curves 73. The abscissa indicates position, and the ordinate indicates density. From this density distribution curve 73, the position, in which, for example, the density is highest, is extracted. A set of highest densities are obtained by repeating the same operation as the above in units of the designated angle. After that, noise is eliminated by connecting the obtained highest densities. As a result, a figure (a reflection figure) that reflects the shape of a target pattern is created. FIG. 14 shows the thus-obtained FIG. 74.

Although, in the second embodiment, the positions in which the density is highest are acquired, the position in which, for example, the density is half the highest density may be used to create a figure that reflects the shape of a target pattern.

After that, as in the first embodiment, the obtained reflection figure data and the image data is output to the density distribution data acquiring section 333, where differentiation is executed in units of the designated angle, thereby acquiring density distribution data in a direction perpendicular to an inclination resulting from the differentiation. From the acquired density distribution data, edge portions of the hole pattern are detected, thereby measuring the area and/or the circumferential length of the pattern, edge roughness, etc.

As described above, the second embodiment provides a similar advantage to that of the first embodiment, and also enables measurement with low influence of noise, since only information near each edge is used to extract the feature of a pattern shape. Moreover, since the second embodiment uses two closed curves that are provided, with the hole edge region 42 interposed therebetween, for defining the measurement range, it can measure patterns of various shapes. Also, the period required for measuring a pattern size which is out of standard shape can be significantly reduced.

(Third Embodiment)

A third embodiment is a modification of the first embodiment, and characterized in the manner of creation of density distribution data. In this embodiment, a description will be given of a case where a hole pattern having a shape different from that employed in the first embodiment is measured.

Figure 15:
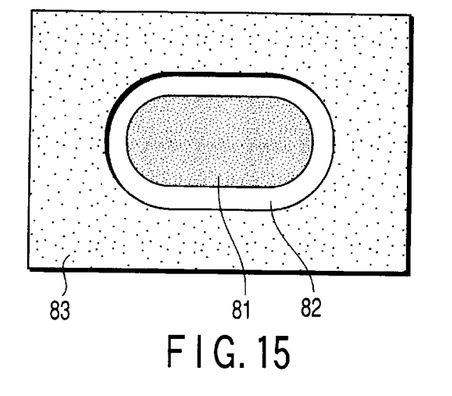
FIG. 15 is a view illustrating SEM image data corresponding to a hole pattern and obtained by a third embodiment of the invention.

First, a sample 11 is transferred into a device as in the first and second embodiments, thereby acquiring an SEM image and outputting it to the image acquiring section 331. FIG. 15 illustrates SEM image data corresponding to a hole pattern to be measured in the third embodiment. As is shown in FIG. 15, the image data in this embodiment is similar to that of the first embodiment in that it comprises a hole bottom region 81, a hole edge region 82 and an outside region 83. However, the hole pattern of the third embodiment is not elliptic but includes linear edge portions.

The image data is output from the image acquiring section 331 to the figure creating section 332. The figure creating section 332 creates a figure, which reflects the shape of the hole pattern, on the basis of the image data shown in FIG. 15, using the same method as in the first or second embodiment. The created figure and the image data is output to the density distribution data acquiring section 333.

Figure 16:
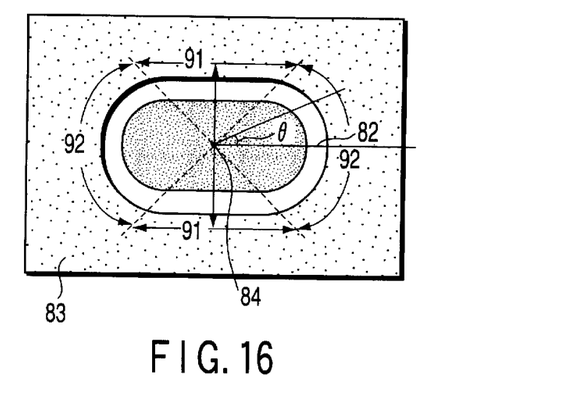
FIG. 16 is a view illustrating SEM image data corresponding to a hole pattern and obtained by the third embodiment of the invention.

FIG. 16 is a view useful in explaining the density distribution data acquiring method. As is shown in FIG. 16, the density distribution data acquiring section 333 first calculates the center-of-gravity 84 of the figure that reflects the shape of the hole pattern, and then calculates the x- and y-coordinates of the figure in units of a designated angle in the same manner as in the first or second embodiment.

Figure 17:
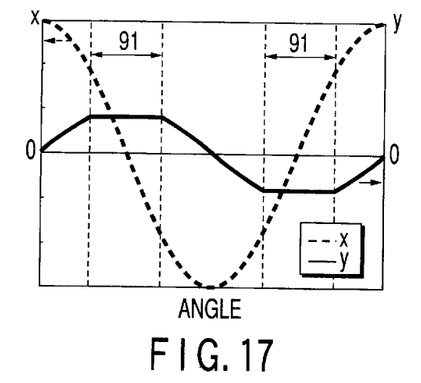
FIG. 17 is a view illustrating the relationship between the x-coordinate, the y-coordinate and an angle θ with respect to a reference straight line, used in the third embodiment.
Figure 18:
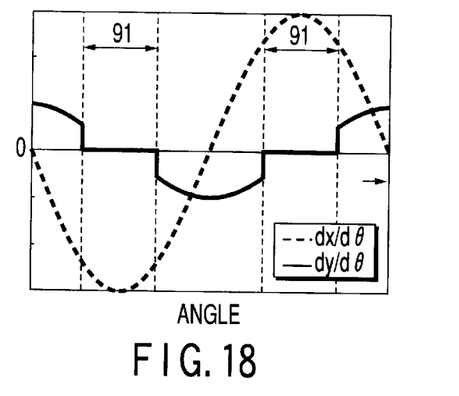
FIG. 18 is a view illustrating curves, used in the third embodiment, obtained by differentiating x- and y-coordinates with respect to the angle θ to the reference straight line.

FIG. 17 shows the relationship between the x- and y-coordinates and the angle θ with respect to a reference straight line. As is understood from FIG. 17, variations in the y-coordinate are smaller in ranges 91 than in the other ranges 92. FIG. 18 shows values obtained by differentiating the x- and y-coordinates of FIG. 17 with respect to the angle θ. The value obtained by differentiating the y-coordinate, i.e. dy/dθ, is almost 0 in the ranges 91. In other words, the outline of the figure is substantially horizontal in the ranges 91. Accordingly, in the ranges 91, density distribution data is acquired in a direction perpendicular to the reference straight line. In the other ranges 92, the outline of the figure is differentiated in respective positions as in the first and second embodiments.

After that, as in the first and second embodiments, edge portions of the hole pattern are detected from the obtained density distribution data, thereby measuring the area, the circumferential length, the roughness, etc. of the hole pattern.

As described above, in the above embodiment, the sampling intervals can be determined efficiently, and hence the measurement period can be reduced. In particular, the period required for measuring a pattern that has a partially small curvature can be reduced.

The above embodiment is directed to a hole pattern having linear edge portions. However, if the outline of a pattern can be expressed using a predetermined function, the inclination of the function, which indicates the outline, can be calculated automatically, and the direction and the frequency of density distribution data acquisition can be determined on the basis of the calculated inclination. In other words, in this case, the process of obtaining the tangential line of each point of a pattern and acquiring density distribution data on a straight line perpendicular to the tangential line can be omitted.

As described above, the present invention can detect an edge in a direction perpendicular to each point of the outline of a pattern, and therefore the detection accuracy of edge portions is enhanced. Accordingly, the measurement accuracy of parameters such as the area, the circumferential length, etc. of the pattern significantly increases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A micropattern measuring method, comprising the steps of:
    acquiring a pattern image of a sample provided with a micropattern formed thereon;
    creating a figure, which reflects a shape of the micropattern, on the basis of the pattern image;
    acquiring density distribution data on a straight line perpendicular to a tangential line of an outline of the figure;
    detecting pattern edge coordinates from the density distribution data; and
    measuring a shape of the micropattern on the basis of the pattern edge coordinates.

2. The micropattern measuring method according to claim 1, wherein the pattern image is divided into a plurality of regions on the basis of variations in image density to create the figure.

3. The micropattern measuring method according to claim 1, wherein, in the step of creating the figure, a representative point and a to-be-measured region extending through 360 degrees around the representative point, are set in the micropattern, and a density distribution is obtained in units of a predetermined angle in the to-be-measured region, thereby obtaining a reference positions in the density distribution, obtaining a rough outline of the micropattern on the basis of the reference position, and creating the figure on the basis of the rough outline.

4. The micropattern measuring method according to claim 1, wherein, in the step of creating the figure, a representative point and a to-be-measured region extending through 360 degrees around the representative point, are set in the micropattern, and a density distribution is obtained in units of a predetermined angle in the to-be-measured region, thereby obtaining a reference position in the density distribution, obtaining a rough outline of the micropattern on the basis of the reference position, and creating the figure on the basis of the rough outline, wherein the to-be-measured region is defined outside a small closed line and inside a large closed line, the small and large closed lines being out of contact with each other and concentric with each other.

5. The micropattern measuring method according to claim 1, wherein a direction and a frequency in which and at which the density distribution data is acquired are determined on the basis of a feature of the shape of the micropattern, and the density distribution data is acquired in the determined direction and at the determined frequency.

6. The micropattern measuring method according to claim 1, wherein a direction and a frequency in which and at which the density distribution data is acquired are determined on the basis of a feature of the shape of the micropattern, and the density distribution data is acquired in the determined direction and at the determined frequency, and the feature of the shape of the micropattern is extracted, using a relationship between coordinates that define the outline of the figure, and an angle with respect to a center-of-gravity of the micropattern.

7. A micropattern measuring apparatus, comprising:
    a pattern image acquiring section for acquiring a pattern image of a sample;
    a figure creating section for creating a figure, which reflects a shape of the micropattern, on the basis of the pattern image;
    a density distribution data acquiring section for acquiring density distribution data on a straight line perpendicular to a tangential line of an outline of the figure;
    an edge detecting section for detecting pattern edge coordinates from the density distribution data; and
    a pattern shape measuring section for measuring a shape of the micropattern on the basis of the pattern edge coordinates.

8. A recording medium recording a micropattern measuring program for supplying a computer with:

a function of acquiring a pattern image of a sample;

a function of creating a figure, which reflects a shape of the micropattern, on the basis of the pattern image;

a function of acquiring density distribution data on a straight line perpendicular to a tangential line of an outline of the figure;

a function of detecting pattern edge coordinates from the density distribution data; and a function of measuring a shape of the micropattern on the basis of the pattern edge coordinates.

\* \* \* \* \*

UNITED STATES PATENT AND TRADEMARK OFFICE
CERTIFICATE OF CORRECTION

PATENT NO.   : 6,480,807 B1
DATED        : November 12, 2002
INVENTOR(S)  : Miyano It is certified that error appears in the above-identified patent and that said Letters Patent is hereby corrected as shown below:

Column 12,
Line 18, change "positions" to -- position --.

Signed and Sealed this

Twenty-second Day of April, 2003

JAMES E. ROGAN
*Director of the United States Patent and Trademark Office*